United States Patent
Thörn et al.

(10) Patent No.: US 9,560,287 B2
(45) Date of Patent: Jan. 31, 2017

(54) NOISE LEVEL BASED EXPOSURE TIME CONTROL FOR SEQUENTIAL SUBIMAGES

(71) Applicant: Sony Corporation, Tokyo (JP)

(72) Inventors: Ola Thörn, Limhamn (SE); Jonas Gustavsson, Lomma (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 94 days.

(21) Appl. No.: 14/576,418

(22) Filed: Dec. 19, 2014

(65) Prior Publication Data

US 2016/0182798 A1  Jun. 23, 2016

(51) Int. Cl.
| | |
|---|---|
| H04N 5/225 | (2006.01) |
| H04N 5/235 | (2006.01) |
| H04N 5/232 | (2006.01) |
| H04N 5/345 | (2011.01) |
| H04N 5/357 | (2011.01) |

(52) U.S. Cl.
CPC ......... *H04N 5/2355* (2013.01); *H04N 5/2353* (2013.01); *H04N 5/23232* (2013.01); *H04N 5/23254* (2013.01); *H04N 5/23258* (2013.01); *H04N 5/23264* (2013.01); *H04N 5/345* (2013.01); *H04N 5/357* (2013.01)

(58) Field of Classification Search
CPC ..................................................... H04N 5/359
USPC ....................... 348/239, 222.1, 362, 223.1
See application file for complete search history.

(56) References Cited

U.S. PATENT DOCUMENTS

| | | | |
|---|---|---|---|
| 2008/0218611 | A1 | 9/2008 | Parulski et al. |
| 2009/0040364 | A1 | 2/2009 | Rubner |
| 2010/0060746 | A9* | 3/2010 | Olsen ............... H01L 27/14645 348/222.1 |
| 2014/0368685 | A1 | 12/2014 | Venkataraman et al. |
| 2016/0044257 | A1* | 2/2016 | Venkataraman ..... H04N 5/2258 348/239 |

FOREIGN PATENT DOCUMENTS

| | | |
|---|---|---|
| EP | 0840502 A2 | 5/1998 |
| WO | 2014138695 A1 | 9/2014 |

OTHER PUBLICATIONS

International Search Report; Sep. 21, 2015; issued in International Application No. PCT/EP2015/063554.

* cited by examiner

*Primary Examiner* — Joel Fosselman
(74) *Attorney, Agent, or Firm* — James C. Edwards; Moore & Van Allen PLLC

(57) ABSTRACT

A sequence of multiple subimages is captured by an imaging sensor organized in multiple subsets of pixels. Each of the subsets of pixels is assigned to capturing a corresponding one of the subimages. For each of the subsets of pixels, a noise level of an output of the pixels of the subset is measured. Depending on the measured noise level, an exposure time for capturing the corresponding subimage is controlled.

18 Claims, 5 Drawing Sheets

NOISE LEVEL BASED EXPOSURE TIME CONTROL FOR SEQUENTIAL SUBIMAGES

FIELD OF THE INVENTION

The present invention relates to a method of imaging a scene and to a correspondingly configured device.

BACKGROUND OF THE INVENTION

Various kinds of electronic devices, e.g., smartphones, tablet computers, or digital cameras, may be equipped with increasingly sophisticated imaging functionalities. Such imaging functionalities for example include capturing of high dynamic range (HDR) still images or videos. Here, the term "HDR" means that a dynamic range concerning an ability to resolve features in regions of low luminosity and high luminosity of an imaged scene is increased as compared to conventionally captured images. This means that a certain contrast level allowing for resolving image details may be attained both in image regions of low luminosity and image regions of high luminosity, avoiding contrast limiting effects of under exposure or over exposure.

A typical way of capturing HDR images is to utilize an imaging sensor for capturing multiple (typically two or three) full resolution images in a row, using different exposure times, and then combine these images to the HDR image. However, due to the time offset between capturing the different images, the combined HDR image may suffer from blurring or ghosting of moving objects in the imaged scene and/or from overall blurring due to movement of the imaging sensor while capturing the different images. While such undesirable effects may in principle be reduced by decreasing the time offset between capturing the different images, such decrease of the time offset may often be limited by the utilized imaging sensor and associated image processing electronics. For example, detecting the outputs of all pixels of the imaging sensor and processing these outputs to obtain the desired image data may limit the time offset. In typical devices, the minimum supported time offset may be in the range 20 to 50 ms.

Accordingly, there is a need for techniques which allow for efficiently capturing high dynamic range images.

SUMMARY OF THE INVENTION

According to an embodiment of the invention, a method of imaging a scene is provided. According to the method, a sequence of multiple subimages is captured by an imaging sensor organized in multiple subsets of pixels. Each of the subsets of pixels is assigned to capturing a corresponding one of the subimages. For each of the subsets of pixels, a noise level of an output of the pixels of the subset is measured. Depending on the measured noise level, an exposure time for capturing the corresponding subimage is then controlled.

According to an embodiment, the method further comprises that, for each of the subsets of pixels, samples of an output signal of the pixels during the exposure time are obtained, and the obtained samples are statistically processed, e.g., by averaging or filtering, to evaluate the noise level and an averaged output signal. In response to the noise level being above a threshold, the exposure time for capturing the subimage corresponding to this subset may be extended to obtain further samples of the output signal of the pixels. In response to the noise level being below the threshold, the exposure time for capturing the subimage corresponding to this subset may be ended. After ending the exposure time of this subimage, the averaged output signal of the pixels may be utilized for obtaining image data of the subimage, and the capturing process may proceed to capturing the next subimage of the sequence by obtaining samples of an output signal of the pixels of the subset of pixels corresponding to this next subimage. Accordingly, the process of obtaining samples for one of the subimages and extending or ending the exposure time for capturing this subimage may be iterated until all subimages have been captured. In this way, the exposure time applied for each of the subimages may be controlled dynamically while capturing the subimage.

According to an embodiment, the subimages are combined to an overall image. The overall image may have a higher pixel resolution than the subimages. In addition or alternatively, the overall image may have a higher dynamic range than the subimages.

According to an embodiment, motion in the imaged scene is detected by analyzing the sequence of subimages. This may for example involve identifying one or more moving objects in the imaged scene by analyzing and comparing the subimages of the sequence. On the basis of the detected motion in the imaged scene, blur or ghosting in the overall image may be compensated. For example, this may involve generating the overall image in such a way that the outputs of pixels identified as representing the same part of a moving object in different subimages is assigned to the same location in the overall image. For example, in some scenarios a moving object may be at different positions when capturing different subimages of the sequence. To avoid that image data representing the same parts of the moving object appear at different positions in the overall image, such image data may be shifted to appropriate positions in the overall image. For example, an average position of the moving object may be determined from the positions of the moving object as identified from the different subimages, and the image data corresponding to the moving object may be aligned with this average position.

According to an embodiment, on the basis of one or more motion sensors, such as one or more accelerometers, motion of the imaging sensor may be detected while capturing the sequence of subimages. On the basis of the detected motion of the imaging sensor, blur in the overall image may be compensated. For example, a movement of the imaging sensor when capturing different subimages of the sequence may cause that the same part of the imaged scene appears at different positions in different subimages. By detecting the motion of the imaging sensor, the image data from the different subimages may be shifted to appropriate locations in the overall image to compensate such effects.

According to an embodiment, an imaging area of the imaging sensor is divided into multiple zones. Each of the subsets of pixels may then be assigned to a corresponding one of the zones. The pixels of each subset may then comprise those pixels of the imaging sensor which are located in the zone to which the subset is assigned. Further, the pixels of each subset may comprise at least one further pixel located in each other zone of the imaging area. Accordingly, the subsets of pixels may each predominantly provide image data from a given zone of the imaging sensor, which means that the exposure time for this zone may be set individually, while at the same time the subset may also provide some image data from all other zones, which means that each subimage may at least be utilized for providing a lower resolution image covering substantially the entire imaging area and a higher resolution image covering the given zone of the imaging sensor.

According to a further embodiment of the invention, a device is provided. The device comprises an imaging sensor and at least one processor. The imaging sensor is organized in multiple subsets of pixels. The at least one processor is configured to capture a sequence of multiple subimages by the imaging sensor. Each of the subsets of pixels is assigned to capturing a corresponding one of the subimages. Further, the at least one processor is configured to, for each of the subsets of pixels, measure a noise level of an output of the pixels of the subset and, depending on the measured noise level, control an exposure time for capturing the corresponding subimage.

According to an embodiment, the at least one processor is configured to perform steps of the method according to the above embodiments.

Accordingly, the at least one processor may be configured to, for each of the subsets of pixels, obtain samples of an output signal of the pixels during the exposure time, statistically process the obtained samples to evaluate the noise level and an averaged output signal, in response to the noise level being above a threshold, extend the exposure time to obtain further samples of the output signal of the pixels, and in response to the noise level being below the threshold, end the exposure time for capturing the subimage.

Further, the at least one processor may be configured to combine the subimages to an overall image. As mentioned above, the overall image may have a higher pixel resolution than the subimages and/or a higher dynamic range than the subimages.

Further, the at least one processor may be configured to, detect motion in an imaged scene by analyzing the sequence of subimages and, on the basis of the detected motion in the imaged scene, compensate blur in the overall image.

According to an embodiment, the device further comprises one or more motion sensors. The at least one processor may then further be configured to, on the basis of one or more motion sensors, detect motion of the imaging sensor while capturing the sequence of subimages and, on the basis of the detected motion of the imaging sensor, compensate blur in the overall image.

According to an embodiment, an imaging area of the imaging sensor is divided into multiple zones, and the subsets of pixels are each assigned to a corresponding one of the zones. The pixels of each subset may then comprise those pixels of the imaging sensor which are located in the zone to which the subset is assigned. In addition, the pixels of each subset may comprise at least one further pixel in each other zone of the imaging area.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to imaging of a scene, specifically with the aim of efficiently capturing HDR still images or HDR videos. In the illustrated embodiments, this involves utilization of an imaging sensor which is organized in multiple subsets of pixels. The subsets of pixels are utilized for capturing a sequence of subimages. In this process, each subset captures a corresponding one of the subimages. For capturing each subimage, an exposure time is individually controlled. This is accomplished depending on a noise level detected in the output of the subset of pixels which captures this subimage. The subimages are then combined to an overall image. In typical scenarios, the overall image has a higher pixel resolution and a higher dynamic range than the subimages. In particular, by allowing individually adapted exposure times for the different subsets of pixels, the exposure times may be optimized depending on the level of luminosity in different regions of the imaged scene, e.g., corresponding to different zones of an imaging area of the imaging sensor. Further, the sequence of subimages may be utilized for detecting motion in the imaged scene and compensate blur or ghosting effects in the overall image. The overall image may be a still image or a video frame of a video. Accordingly, a HDR still image or an HDR video may be obtained in an efficient manner.

Figure 1:
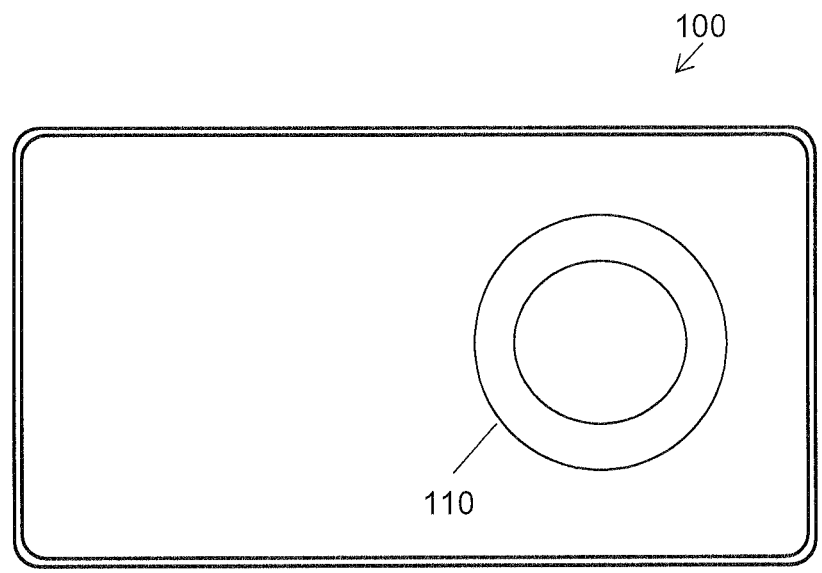
FIG. 1 schematically illustrates a scenario a device according to an embodiment of the invention.

FIG. 1 shows an exemplary device 100 which may be utilized for imaging a scene in accordance with the concepts as outlined above. The device 100 may for example be a smartphone, a digital camera (e.g., a compact camera, an action cam, or a life-log camera), a portable media player, a tablet computer, a sports computer, a smart watch, or the like. As illustrated, the device 100 is equipped with a camera 110. The camera 110 may support capturing still images and/or videos. For this purpose, the camera 110 provides an imaging sensor (not illustrated in FIG. 1) with a plurality of light sensitive pixels. An output of the pixels is utilized for generating image data, from which still images and/or videos may be generated. Such processing of the output of the pixels may be accomplished by corresponding processors of the device 100. However, in some scenarios at least a part of the processing may also be accomplished externally, e.g., by one or more other devices. For example, the device 100 may provide an interface for transferring raw image data to another device or to a network based service, and processing of the raw data, e.g., to combine the subimages to the overall image, may then be performed by this other device or network service.

Figure 2:
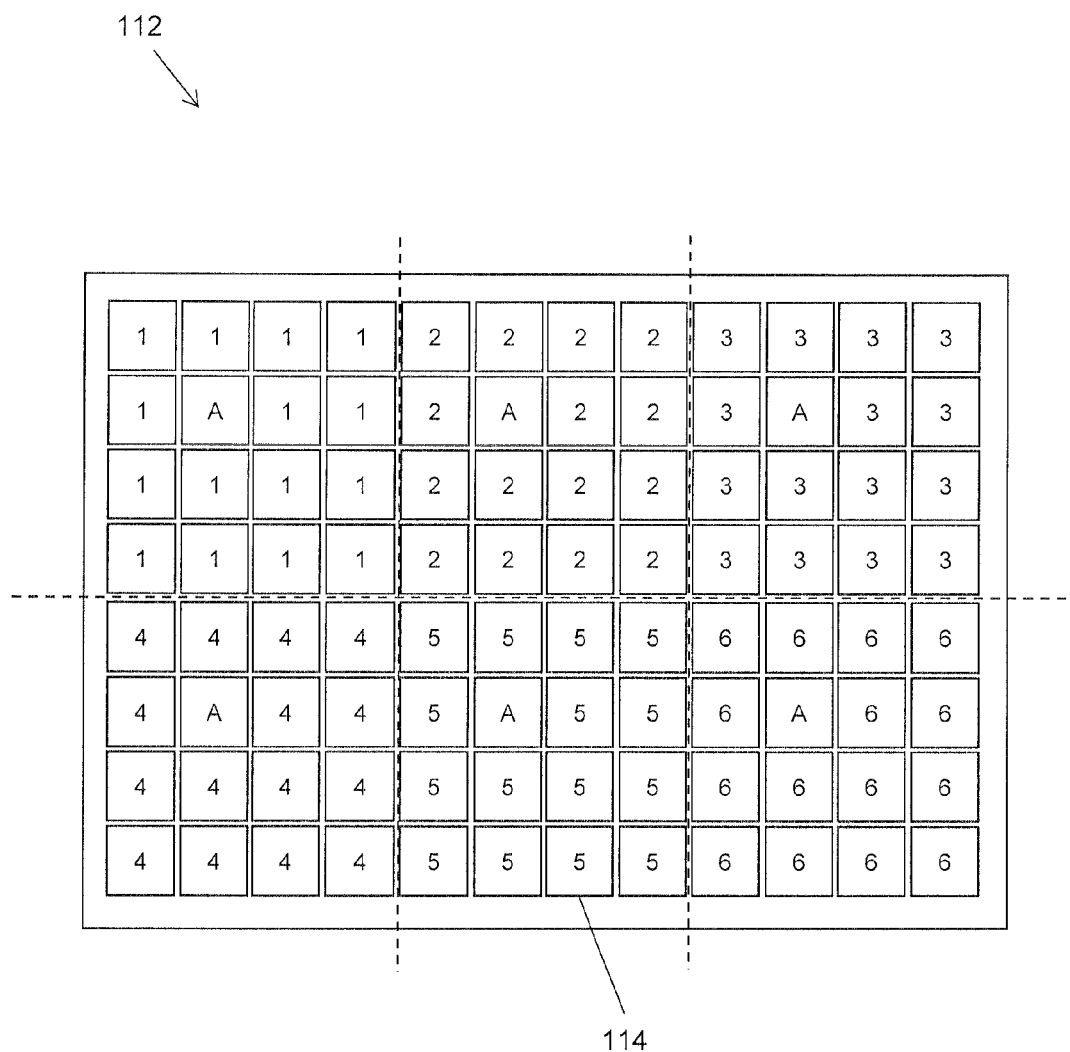
FIG. 2 schematically illustrates an imaging sensor which may be utilized according to an embodiment of the invention.

FIG. 2 schematically illustrates an exemplary imaging sensor 112 of the camera 110. As illustrated, the imaging sensor 112 includes a plurality of light-sensitive pixels 114 distributed in an array over an imaging area of the imaging sensor 112. The imaging sensor 112 may for example correspond to a CCD (Charge Coupled Device) or CMOS (Complementary Metal Oxide Semiconductor) image sensor chip. In the illustrated example, the pixels 114 are distributed in a rectangular array. However, it is to be understood that other ways of arranging the pixels may be utilized as well, e.g., based on a hexagonal pattern of pixels. Moreover, it is to be understood that the illustrated number of the pixels 114 was selected for illustration purposes, and that in typical practical implementations the imaging sensor may provide a number of pixels which is significantly larger, e.g., in a range of one million pixels to 50 million pixels or even more. Further, it is to be understood that each of the pixels may deliver an output signal representing a corresponding luminosity of one or more color channels. In the following, it will be assumed that pixels 114 of the imaging sensor 112 each provide an output represented by three color channels, thereby allowing for capturing full color still images or videos.

As further illustrated in FIG. 2, the imaging area of the imaging sensor 112 is divided into multiple zones (in FIG. 2 separated by dashed lines). When capturing an image, each of the zones will provide image data corresponding to a certain part of the imaged scene. The illustrative example of FIG. 2 assumes six zones arranged in a rectangular pattern. However, it is to be understood that in practical implementations other numbers of zones and/or other geometric arrangements of the zones may be utilized. Further, rather than defining non-overlapping zones as illustrated in FIG. 2, it is also possible to define the zone in such a way that neighboring zones overlap each other.

In accordance with the different zones, the imaging sensor 112 is organized in multiple subsets of the pixels 114. In the example of FIG. 2, the subsets of pixels are indicated by a numeral or letter in the pixels 114. The pixels 114 which are part of a first subset are identified by numeral "1" or letter "A". A majority of the pixels 114 of the first subset, identified by numeral "1" is located in a first zone of the imaging area, in FIG. 2 illustrated as being located in an upper left corner of the imaging area. Further pixels 114 of the first subset, identified by letter "A", are distributed over all zones of the imaging area. The pixels 114 which are part of a second subset are identified by numeral "2" or letter "A". A majority of the pixels 114 of the second subset, identified by numeral "2" is located in a second zone of the imaging area, in FIG. 2 illustrated as being located in an upper middle portion of the imaging area. Further pixels 114 of the second subset, identified by letter "A", are distributed over all zones of the imaging area. The pixels 114 which are part of a third subset are identified by numeral "3" or letter "A". A majority of the pixels 114 of the third subset, identified by numeral "3" is located in a third zone of the imaging area, in FIG. 2 illustrated as being located in an upper right corner of the imaging area. Further pixels 114 of the third subset, identified by letter "A", are distributed over all zones of the imaging area. The pixels 114 which are part of a fourth subset are identified by numeral "4" or letter "A". A majority of the pixels 114 of the fourth subset, identified by numeral "4" is located in a fourth zone of the imaging area, in FIG. 2 illustrated as being located in a lower left corner of the imaging area. Further pixels 114 of the fourth subset, identified by letter "A", are distributed over all zones of the imaging area. The pixels 114 which are part of a fifth subset are identified by numeral "5" or letter "A". A majority of the pixels 114 of the fifth subset, identified by numeral "5" is located in a fifth zone of the imaging area, in FIG. 2 illustrated as being located in an lower middle portion of the imaging area. Further pixels 114 of the fifth subset, identified by letter "A", are distributed over all zones of the imaging area. The pixels 114 which are part of a sixth subset are identified by numeral "6" or letter "A". A majority of the pixels 114 of the second subset, identified by numeral "6" is located in a sixth zone of the imaging area, in FIG. 2 illustrated as being located in a lower right corner of the imaging area. Further pixels 114 of the sixth subset, identified by letter "A", are distributed over all zones of the imaging area. Accordingly, each of the subsets of pixels has a main focus on a corresponding zone of the imaging area, but there is also an overlap between the different subsets with respect to the pixels 114 identified by letter "A", which are distributed over the imaging area. As will be further explained below, the pixels 114 of each subset which are distributed over the imaging area allow for providing an image covering substantially the entire imaging area with each subset of pixels.

The subsets of pixels are utilized in a temporal sequence for capturing the sequence of subimages. In the example of FIG. 2, this may involve capturing the following temporal sequence of subimages: a first subimage captured by only the first subset of pixels, a second subimage captured by only the second subset of pixels, a third subimage captured by only the third subset of pixels, a fourth subimage captured by only the fourth subset of pixels, a fifth subimage captured by only the fifth subset of pixels, and a sixth subimage captured only be the sixth subset of pixels.

For each subimage of the sequence, and accordingly for each subset of pixels, the exposure time is controlled individually on the basis of the noise level observed on the output of the pixels 114 of this subset. As a general rule, the noise level depends on the level of luminosity to which the pixels 114 are subjected. For lower levels of luminosity, the noise level increases. This may be compensated by increasing the exposure time, i.e., by sampling the output of the pixels over a longer time interval. For example, multiple samples of the output of each pixel 114 of the subset may be obtained over the exposure time and then averaged or otherwise filtered to obtain an average output with a lower noise level. The noise level may be evaluated for multiple pixels of the subset, e.g., all pixels or a representative selection of pixels of the subset, e.g., by averaging or otherwise statistically processing the observed variations in the pixel outputs. As a result, a single value representing the noise level for the subset may be obtained and then be used for setting the exposure time when capturing the subimage.

In some implementations, the noise level may be measured while capturing the subimage. For example, samples of the pixel output signals may be collected over the exposure time and be utilized to calculate the noise level for the subset and an average output for each pixel. As long as the noise level is above a threshold, the exposure time may be extended to collect further samples of the pixel outputs. By considering the further samples in the calculated noise level and average pixel outputs, a lower noise level and more accurate pixel outputs are obtained. The recalculated noise level may then again be compared to the threshold. This process may be repeated in an iterative manner until the comparison yields a noise level below the threshold or a maximum exposure time, e.g., in the range of 50 to 100 ms is reached. The threshold and/or maximum exposure time may be configurable by the user of the device. Alternatively, the threshold and/or maximum exposure time may be preconfigured by the manufacturer of the device. The threshold may also be context dependent, i.e., depend on one or more parameters associated with an operating context of the device. For example, the threshold may depend on whether it is night or day. Further, the threshold may depend on a location of the device. Further, the threshold may depend on speed of the device, e.g., as measured by one or more sensors. This may for example allow for distinguishing whether the device is used by a person who is running or walking or by a person who is standing still. The threshold may also depend on a type of the imaged scene, e.g., whether main elements of the imaged scene correspond to one or more persons or to landscape structures or other elements which are typically static. The threshold may also be derived from user preferences, from a scoring of previously captured image data, from social media data, or the like. By controlling the exposure times for the subsets individually on the basis of the corresponding observed noise level, optimized exposure times for the different zones of the imaging sensor may be obtained. For example, if one of the zones is subjected to a high level of luminosity in the imaged scene, the desired noise level may be reached with a short exposure time. Similarly, if another one of the zones is subjected to a low level of luminosity in the imaged scene, the desired noise level may be reached with a longer exposure time. Underexposure or overexposure of the subimages can thus be avoided.

As mentioned above, the subimages of the sequence are combined to the overall image. The overall image will typically cover the entire imaging area of the imaging sensor and have the full pixel resolution offered by the imaging sensor 112. For generating the overall image, the parts of the subimages corresponding to the different zones of the imaging area may be merged. If there are overlaps of the different zones, an averaging or other form of blending of the image data in the overlapping areas to minimize artifacts of the merging process. For the same reason, averaging or other blending may also be applied at the border of non-overlapping zones. Due to the individually optimized exposure times, the resulting overall will typically have a higher dynamic range than the individual subimages and also than an image captured by a single simultaneous exposure of all pixels of the imaging sensor 112.

In some scenarios, it may be beneficial to further consider motion in the imaged scene and/or motion of the imaging sensor when merging the subimages to the overall image. For example, since the subimages are captured at different time instances, there is a risk that a moving object in the imaged scene causes blur or ghosting in the overall image, e.g., if the positions of the object in different subimages correspond to different positions in the overall image. Further, motion of the imaging sensor while capturing the sequence of subimages may cause a risk that the same elements of the imaged scene appear in different subimages but are mapped to different positions in the overall image.

For compensation of the effects of motion in the imaged scene, the time resolution provided by the sequence of subimages may be utilized. In particular, the subimages may be analyzed to identify motion in the imaged scene. This may for example involve identifying one or more moving objects in the imaged scene. Various kinds of object identification algorithms may be applied for this purpose. Further, the different subimages may be compared to each other to identify and/or quantify movements, e.g., by calculating motion vectors. When combining the subimages to the overall image, the detected motion in the imaged scene may be considered and compensated. For example, for a moving object the corresponding image data may be extracted from the different subimages and projected to the same position in the overall image. Such position may for example correspond to a position obtained by averaging positions of the moving object as derived from the different subimages. Accordingly, the time offset sequence of subimages may be applied for efficiently avoiding or minimizing effects of blur or ghosting due to motion in the imaged scene.

For compensation of the effects of motion of the imaging sensor 112 itself, outputs of one or more motion sensors (e.g., accelerometers) of the device 100 may be utilized. For example, such motion sensors may be utilized to detect and quantify movement (e.g., in terms of direction, distance, and/or speed) of the imaging sensor 112 between time instances of capturing different subimages and to shift the corresponding image data accordingly when combining the subimages to the overall image. Various known image stabilization techniques based on processing time offset image sequences may be applied. In addition or alternatively, also the motion sensors may also be utilized for performing mechanical image stabilization by actively moving the imaging sensor depending on the outputs of the motion sensors. Accordingly, by utilizing the outputs of motion sensors, effects of blur or ghosting due to motion in the imaging sensor itself may be efficiently avoided or minimized.

Figure 3:
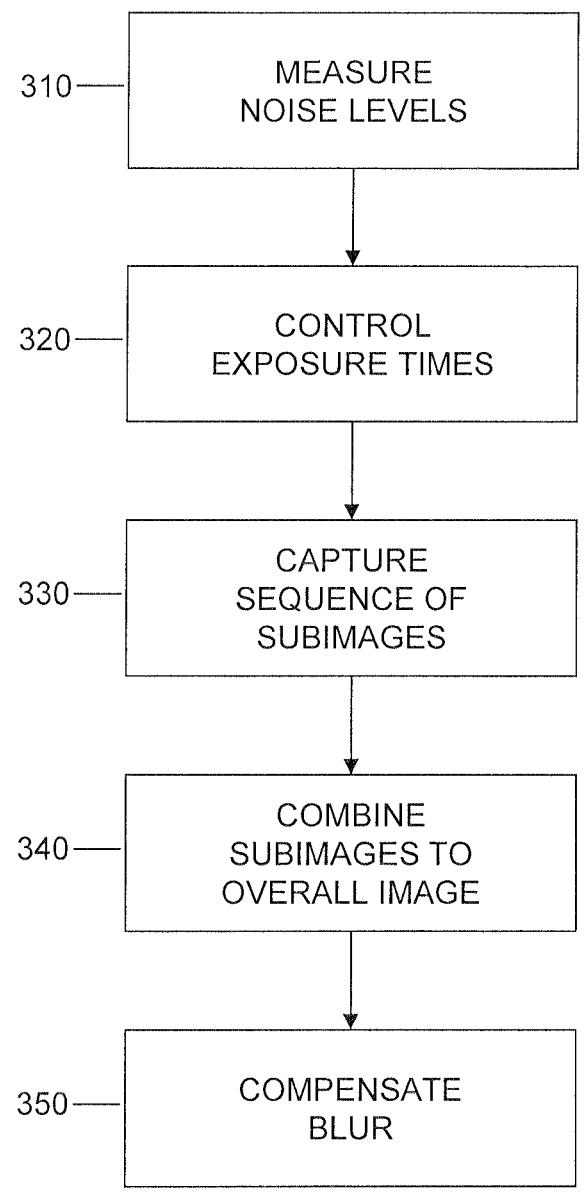
FIG. 3 shows a flowchart for illustrating a method according to an embodiment of the invention.

FIG. 3 shows a flowchart which illustrates a method of imaging a scene. The method may for example be implemented in a device equipped with an imaging sensor organized in multiple subsets of pixels, such as the abovementioned imaging sensor 112. If a processor based implementation of the device is utilized, at least a part of the steps of the method may be performed and/or controlled by one or more processors of the device.

At step 310, a noise level is measured with respect to each of the subsets of pixels. The noise level may be measured by statistically processing outputs of the pixels of the subsets, e.g., by averaging or otherwise filtering a variation of the outputs of multiple pixels of the subset. Here, both a temporal variation and a variation between different pixels may be considered.

The noise level may be measure while capturing a subimage by the subset of pixels. Further, the noise level could also be measured before capturing a subimage by the subset of pixels, e.g., in a dedicated noise measurement phase.

At step 320, exposure times are controlled depending on the measured noise levels. In particular, for each of the subsets, a corresponding exposure time is set depending on the corresponding measured noise level. With increasing noise level, a higher exposure time may be selected. The exposure times may be controlled in a range between a minimum exposure time, e.g., as minimally supported by the imaging sensor and associated readout and signal processing electronics, and a maximum exposure time, e.g., as configured by the user or device manufacturer. In some implementations, the exposure times may be controlled by an iterative process while measuring the noise level and capturing a subimage. An example of such iterative process is further described in connection with FIG. 4.

At step 330, a sequence of subimages is captured. Each of the subimages is captured by a corresponding one of the subsets of pixels. At the same time, the other subsets of pixels may be inactive. Accordingly, only a portion of the imaging sensor may be active when capturing each subimage, which means that, as compared to capturing an image by all pixels of the imaging sensor, faster readout of image data and lower memory requirement for storing the image data may be achieved. In some implementations, the sequence subimages may be captured in a time interval which corresponds to typical exposure times of a still image, e.g., in a time interval ranging from 10 ms to 1 s. The time interval may be set depending on the number of subsets of pixels and captured subimages and/or depending on configured maximum exposure time for each subimage.

An imaging area of the imaging sensor may be divided into multiple zones, and the subsets of pixels may each be assigned to a corresponding one of the zones. The pixels of each subset may then include those pixels of the imaging sensor which are located in the zone to which the subset is assigned. Further, the pixels of each subset may also include further pixels in the other zones of the imaging area. An example of such organization into subsets of pixels was explained in connection with FIG. 2.

At step 340, the subimages of the sequence are combined to an overall image. The overall image typically has a higher pixel resolution than the subimages, e.g., a pixel resolution corresponding to a total number of pixels of the imaging sensor. Further, the overall image typically has a higher dynamic range than the subimages. This higher dynamic range may be achieved by individually optimized exposure times for different zones of the imaging sensor, which may be subjected to different levels of luminosity in the imaged scene.

At step 350, blur in the overall image may be compensated. This may be achieved by analyzing the sequence of subimages to detect motion in the imaged scene. On the basis of the detected motion in the imaged scene, blur in the overall image may then be compensated. For example, this may involve mapping image data corresponding to an identified moving object as extracted from different subimages to a certain position in the overall image, e.g., to a position determined by averaging positions of the moving object as derived from the different subimages.

In some implementations, step 350 may also involve compensating blur of due to movement of the imaging sensor itself. This may be accomplished on the basis of one or more motion sensors, such as accelerometers. These motion sensors may be utilized for detecting motion of the imaging sensor or the device to which the imaging sensor is mounted while capturing the sequence of subimages. The detected motion may then be used as a basis for compensating blur in the overall image. Such compensation may involve processing of image data of the subimages, e.g., by shifting positions on the overall image to which the image data are mapped in accordance with the motion of the imaging sensor. In addition or alternatively, outputs of the imaging sensors may also be used for physically moving the image sensor while capturing the sequence of subimages to thereby counteract undesired movement of the imaging sensor, such as shaking or vibrations.

Depending on the underlying application scenario, the overall image may then be further processed to a still image or a video frame of a video. Capturing a video may involve repeating the steps of the method for each video frame of the video.

Figure 4:
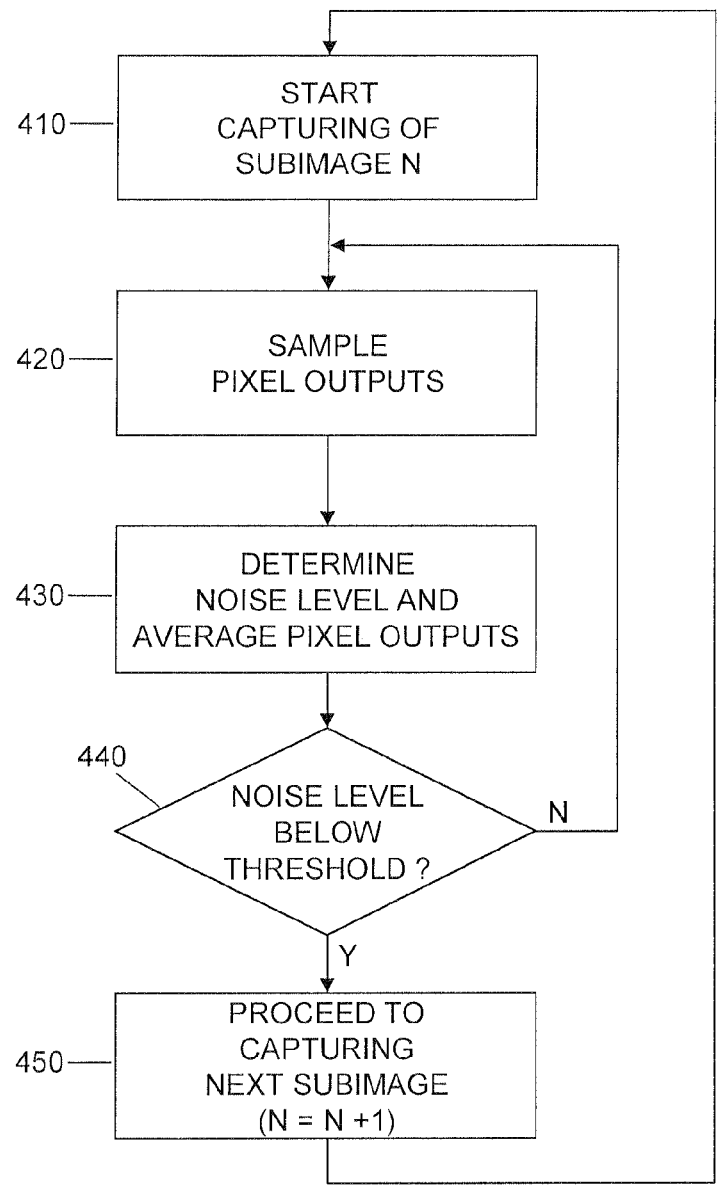
FIG. 4 shows a flowchart for illustrating a process of controlling exposure times which may be applied in method of FIG. 3.

FIG. 4 shows a flowchart for illustrating an iterative process of controlling the exposure time while capturing the subimage, which may be applied within the overall method of FIG. 3.

At step 410, capturing of a given subimage of the sequence, identified by index N, starts. The subset of pixels assigned to capturing this subimage may therefore be selected at this point.

As indicated by step 420, the capturing of the subimage involves obtaining samples of outputs signals of the pixels of the subset of pixels.

At step 430, the obtained samples are statistically processed to determine the noise level and average pixel outputs. The statistic processing may for example involve temporal averaging of the output signals of the pixels, spatial smoothing of the output signals of neighboring pixels, and/or temporal and/or spatial averaging of variations of the outputs of multiple pixels of the subset.

At step 440, the measured noise level is compared to a threshold, e.g., as configured by the user or device manufacturer. The threshold may also be context dependent. For example, the threshold may depend on whether it is night or day. Further, the threshold may depend on a location of the device. Further, the threshold may depend on speed of the device. The threshold may also depend on a type of the imaged scene. The threshold may also be derived from user preferences, from a scoring of previously captured image data, or from social media data.

In response to the noise level not being below the threshold, as indicated by branch "N", the method returns to step 420 to obtain further samples of outputs signals of the pixels of the subset of pixels and repeat the determination of the noise level and average pixel outputs taking into account the further obtained samples.

If the comparison of step shows that the noise level is below the threshold, the method proceeds to step 450, as indicated by branch "Y". At step 450, the method returns to step 410 to proceed with the capturing of the next subimage, identified by index N+1, using another one of the subsets of pixels.

Figure 5:
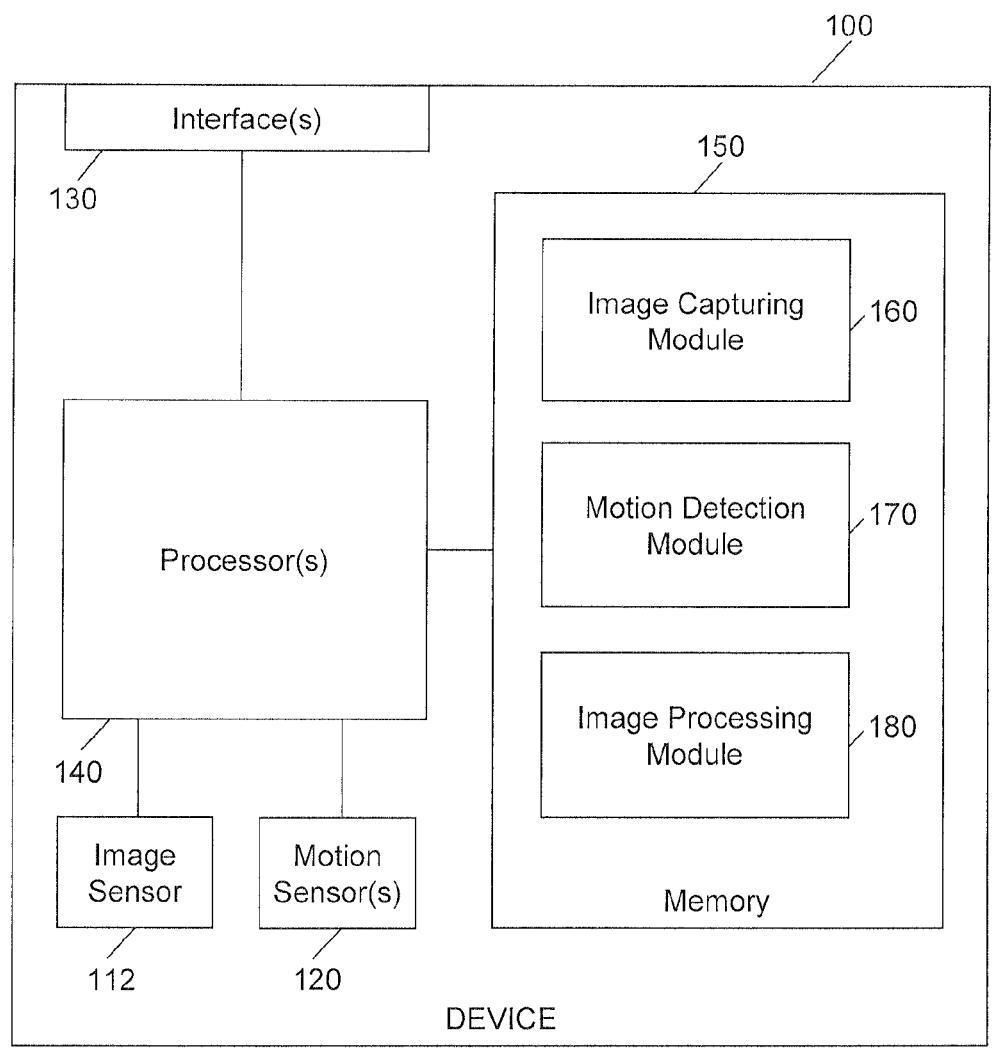
FIG. 5 schematically illustrates a device according to an embodiment of the invention.

FIG. 5 shows a block diagram for schematically illustrating a processor based implementation of a device which may be utilized for implementing the above-described concepts. For example, the structures as illustrated by FIG. 5 may be utilized to implement the device 100 as illustrated in FIG. 1.

As illustrated, the device 100 includes an imaging sensor, such as the imaging sensor 112. Further, the device 100 may include one or more motion sensors 120, such as accelerometers. Further, the device 100 may include one or more interfaces 130. For example, if the device 100 corresponds to a smartphone or similar portable communication device, the interface(s) 130 may include one or more radio interfaces and/or one or more wire-based interfaces for providing network connectivity of the device 100. Examples of radio technologies for implementing such radio interface(s) for example include cellular radio technologies, such as GSM (Global System for Mobile Communications), UMTS (Universal Mobile Telecommunication System), LTE (Long Term Evolution), or CDMA2000, a WLAN (Wireless Local Area Network) technology according to an IEEE 802.11 standard, or a WPAN (Wireless Personal Area Network) technology, such as Bluetooth. Examples of wire-based network technologies for implementing such wire-based interface(s) for example include Ethernet technologies and USB (Universal Serial Bus) technologies.

Further, the device 100 is provided with one or more processors 140 and a memory 150. The imaging sensor 112, the motion sensors 120, the interface(s) 130, and the memory 150 are coupled to the processor(s) 140, e.g., using one or more internal bus systems of the device 100.

The memory 150 includes program code modules 160, 170, 180 with program code to be executed by the processor(s) 140. In the illustrated example, these program code modules include an image capturing module 160, a motion detection module 170, and an image processing module 180.

The image capturing module 160 may implement the above-described functionalities of capturing a sequence of subimages by different subsets of pixels of the imaging sensor 112. Further, the image capturing module 160 may also implement the above-described control of exposure times depending on measured noise levels.

The motion detection module 170 may implement the above-described functionalities of detecting motion in the captured scene, e.g., on the basis of an analysis of the sequence of subimages or on the basis of outputs of the motion sensor(s) 120.

The image processing module 180 may implement the above-described functionalities of combining the subimages to an overall image. This may also include the compensation of blur or ghosting.

It is to be understood that the structures as illustrated in FIG. 5 are merely exemplary and that the device 100 may also include other elements which have not been illustrated, e.g., structures or program code modules for implementing known functionalities of a smartphone, digital camera, or similar device. Examples of such functionalities include communication functionalities, media handling functionalities, or the like.

As can be seen, the concepts as explained above allow for efficiently capturing image data. Specifically, by the individual control of exposure times in connection with the sequential utilization of different subsets of pixels of the imaging sensor allows for efficiently providing still images or videos with low noise, high pixel resolution and high dynamic range.

It is to be understood that the concepts as explained above are susceptible to various modifications. For example, the concepts could be applied in various kinds of devices, in connection with various kinds of imaging sensor technologies, without limitation to CCD or CMOS pixel arrays, but also including array cameras or stereoscopic cameras. Further, the concepts may be applied with respect to various kinds of pixel resolution of imaging sensors. Moreover, various ways of organizing the imaging sensor in multiple subsets of pixels may be utilized.

The invention claimed is:

1. A method of imaging a scene, the method comprising:
capturing a sequence of multiple subimages by an imaging sensor organized in multiple subsets of pixels, each of the subsets of pixels being assigned to capturing a corresponding one of the subimages; and
for each of the subsets of pixels:
obtaining samples of an output signal of the subsets of pixels during the exposure time;
processing the obtained samples to evaluate the noise level and an averaged output signal;
in response to the noise level being above a threshold, extending the exposure time to obtain further samples of the output signal of the pixels; and
in response to the noise level being below the threshold, ending the exposure time for capturing the subimage.

2. The method according to claim 1, comprising:
combining the subimages to an overall image.

3. The method according to claim 2, wherein the overall image has a higher pixel resolution than the subimages.

4. The method according to claim 2, wherein the overall image has a higher dynamic range than the subimages.

5. The method according to claim 2, comprising:
by analyzing the sequence of subimages, detecting motion in the imaged scene; and
on the basis of the detected motion in the imaged scene, compensating blur in the overall image.

6. The method according to claim 2, comprising:
on the basis of one or more motion sensors, detecting motion of the imaging sensor while capturing the sequence of subimages; and
on the basis of the detected motion of the imaging sensor, compensating blur in the overall image.

7. The method according to claim 1,
wherein an imaging area of the imaging sensor is divided into multiple zones, and
wherein the subsets of pixels are each assigned to a corresponding one of the zones.

8. The method according to claim 7, wherein the pixels of each subset comprise those pixels of the imaging sensor which are located in the zone to which the subset is assigned.

9. The method according to claim 8, wherein the pixels of each subset comprise at least one further pixel in each other zone of the imaging area.

10. A device, comprising:
at least one imaging sensor organized in multiple subsets of pixels; and
at least one processor, the at least one processor being configured to:
capture a sequence of multiple subimages by the imaging sensor, each of the subsets of pixels being assigned to capturing a corresponding one of the subimages; and
for each of the subsets of pixels:
obtain samples of an output signal of the subsets of pixels during the exposure time;
process the obtained samples to evaluate the noise level and an averaged output signal;
in response to the noise level being above a threshold, extend the exposure time to obtain further samples of the output signal of the pixels; and
in response to the noise level being below the threshold, end the exposure time for capturing the subimage.

11. The device according to claim 10, wherein the at least one processor is configured to combine the subimages to an overall image.

12. The device according to claim 11, wherein the overall image has a higher pixel resolution than the subimages.

13. The device according to claim 11, wherein the overall image has a higher dynamic range than the subimages.

14. The device according to claim 11, wherein the at least one processor is configured to:
by analyzing the sequence of subimages, detect motion in an imaged scene; and
on the basis of the detected motion in the imaged scene, compensate blur in the overall image.

15. The device according to claim 11,
wherein the device further comprises one or more motion sensors, and
wherein the at least one processor is configured to:
on the basis of one or more motion sensors, detect motion of the imaging sensor while capturing the sequence of subimages; and
on the basis of the detected motion of the imaging sensor, compensate blur in the overall image.

16. The device according to claim 10,
wherein an imaging area of the imaging sensor is divided into multiple zones, and
wherein the subsets of pixels are each assigned to a corresponding one of the zones.

17. The device according to claim 16, wherein the pixels of each subset comprise those pixels of the imaging sensor which are located in the zone to which the subset is assigned.

18. The device according to claim 17, wherein the pixels of each subset comprise at least one further pixel in each other zone of the imaging area.

* * * * *